Nov. 30, 1948.  J. V. BROWN  2,454,962
CONTAINER FOR ELECTRICAL APPARATUS
Filed April 10, 1944
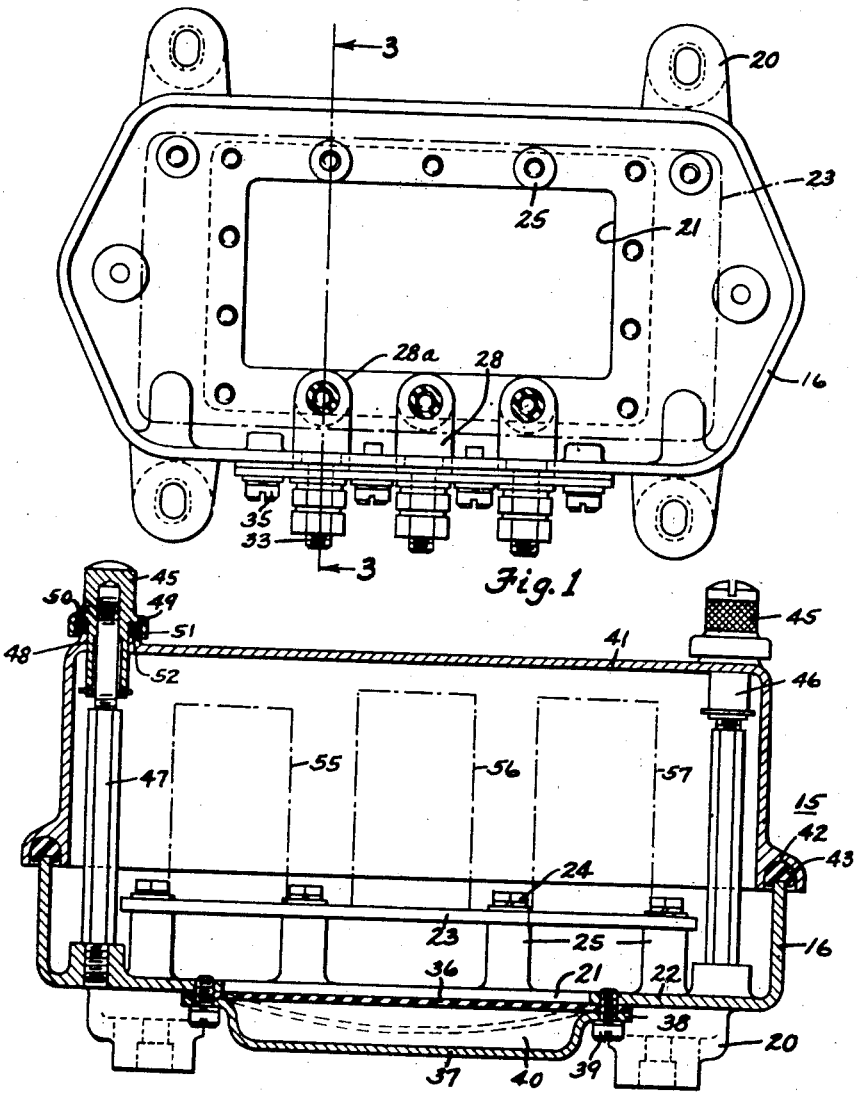
Fig. 1
Fig. 2
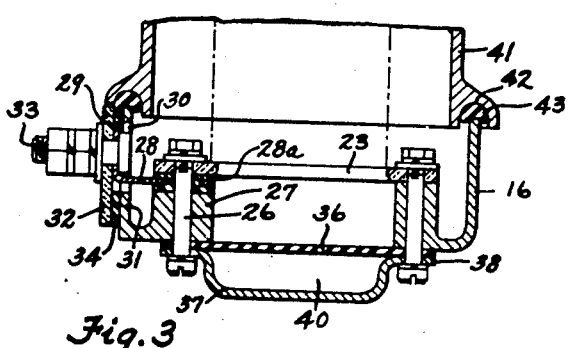
Fig. 3
INVENTOR
James V. Brown
BY
Spencer, Hardman & Fehr
His ATTORNEYS Patented Nov. 30, 1948

2,454,962

UNITED STATES PATENT OFFICE 2,454,962

CONTAINER FOR ELECTRICAL APPARATUS

James V. Brown, Anderson, Ind., assignor to General Motors Corporation, Detroit, Mich., a corporation of Delaware Application April 10, 1944, Serial No. 530,413

4 Claims. (Cl. 174—18)

1

This invention relates to improvements to containers adapted to enclose electrical circuit breakers or other delicate instruments, and more particularly to containers having a cover with a sealing gasket or ring located between the container and cover and placed in a compartment subject to changes in temperatures.

It is the practice to mount a container, especially a container enclosing circuit breakers, for controlling a circuit between a generator and storage battery of an automotive vehicle, within an engine compartment. Hence the container is subject to changes in temperature which causes the air within the container to expand and contract.

Heretofore, when the temperature increases, the air within the container expands and is forced out through or around the various gasket sealing means for the container. When the temperature is reduced air rushes in to the container so as to equalize the pressure. This air which is drawn in carries in moisture or dust which might interfere with the proper operation of the apparatus within the container. It is the primary object of the present invention to provide means wherein this breathing of air around the sealing gaskets or rings cannot occur. This is accomplished by providing one wall of the container with an opening which is covered by a flexible member, preferably a rubber diaphragm, which can move in or out with changes of pressure caused by changes in temperature.

Further objects and advantages of the present invention will be apparent from the following description, reference being had to the accompanying drawings wherein a preferred embodiment of the present invention is clearly shown.

In the drawings:

Fig. 1 is a top plan view of the container with the cover removed.

Fig. 2 is a longitudinal sectional view of the container and a cover therefor, the dotted lines showing the position of a rubber diaphragm when the air is subject to high temperatures.

Fig. 3 is a sectional view taken on the line 3—3 of Fig. 1

Referring to the drawings, 15 designates a container including a casing 16 having apertured mounting ears 20 extending therefrom. The casing is provided with an opening 21 in its bottom wall 22. In the present instance the casing 16 carries a non-conducting plate 23 attached at one side thereof by nuts or bolts 24, the bolts passing through apertures of lugs 25 formed integral with the bottom wall of the casing. The other side

2 of the plate is attached to the casing by nuts and bolts 26, the bolts passing through lugs 27 formed integral with the bottom wall of the casing. Each nut and bolt device 26 also secures one end 28a of an L-shaped terminal strap 28. The other end 29 of the strap projects laterally from the plate and extends into an opening 30 provided in a side wall 31 of the casing. The straps are secured to a non-conducting plate 32 by terminals 33, which may be in the form of binding posts. The plate 32 overlies the marginal walls of the opening 30 and the opening is sealed against ingress of moisture or dirt by a soft compressible gasket 34 disposed between the plate and the outer face of the wall 31. The plate 32 and gasket 34 are secured in place by screws 35, see Fig. 1.

The opening 21 in the bottom wall is closed by a flexible element or diaphragm 36. The flexible element is tightly held in place at its marginal edges by a sunken plate 37 having a peripheral flange 38 provided with suitable openings to receive bolts 24 and 26 and other openings to receive screws 39 having threaded engagement with tapped holes in the bottom wall 22. The flexible element or diaphragm is preferably made of soft sheet rubber and is normally flat. This rubber element is preferably on the outside of the wall and entirely covers the opening 21 and hermetically seals the opening against atmospheric conditions. The flexible element cooperates with plate 37 to provide an air chamber 40. Thus upon change of ambient temperature past certain definite limits, the diaphragm moves into the chamber 40. This movement of the diaphragm in response to temperature change is utilized to prevent breathing at the sealed joints.

The open end of the container or casing 16 is closed by a removable cup-shaped cover 41, the rim of which is enlarged to form a groove or seat 42 in which is placed a suitable gasket 43, preferably a continuous ring of soft rubber or other yieldable material. When the cover is placed over the casing the packing will rest upon the peripheral flange of the casing.

The cover 41 is locked in place by a plurality of screw caps 45 each having a shank 46. Since the caps 45 are identical, only one cap will be described. The axis of the shank is provided with an internal screw-thread portion for the reception of a threaded portion of a stud 47 which is carried by the bottom wall of the casing and projects upwardly through apertures 48 provided by the cover. Each screw-cap is provided with an annular groove 49 about the shank to receive a composite washer 50 made of insulating material including an apertured disc and a soft rubber washer 51 on each side of the washer 50 so that one washer will lie flat against the flat surface of the groove 49 and the other will bear against the flat surface provided by a boss 52 on the exterior surface of the cover. These rubber washers are compressed when the cap-screw is threaded upon the stud 47 and a hermetical seal is provided at that joint.

When the cap-screws 46 are being threaded upon the studs the yieldable gasket 48 is also compressed causing portions thereof to flow over the peripheral edges of the rim so as to provide a moisture-proof joint thus preventing moisture or dust from entering the container when the cover is in locked position upon the casing.

The casing as described above is adapted to enclose a plurality of circuit breaker or other suitable delicate instruments 55, 56 and 57 indicated by dot and dash lines. When the container, for example, encloses electrical instruments for controlling various circuits of an automobile, the container is usually mounted in the engine compartment. Hence the container is subject to changes in temperatures. Thus when the temperature increases, the air within the container expands. This matter of providing the container with a flexible diaphragm has been found to be very effective should the air expand as the pressure created within the container will cause the diaphragm to flex downwardly into the expansion chamber 40. By providing the expansion chamber 40 no air will be forced past any of the sealing joints nor will any air or dust be drawn in space in the container when the temperature is reduced. Since the chamber 40 is much smaller than the space above the diaphragm the air in said chamber will act as a spring.

It is obvious that such a deformable diaphragm in a container, which houses delicate instruments or circuit-breakers, is a desirable feature for otherwise dust or moisture would enter the container when pressure within the container is relieved.

It is pointed out that the diaphragm need not be restricted to its location in the bottom of the container. The diaphragm may be located in any wall of the container or even in the cover. Irrespective of location of the diaphragm it will be seen that when the diaphragm is capable of moving in and out of the chamber 40 with changes of pressure caused by changes in temperatures, thus no moisture or dust is drawn into the casing which might interfere with the proper operation of the devices within the container.

It is also pointed out that the chamber 40 could be formed by constructing a wall in the cover or casing with a suitable depression, and said depression covered with the diaphragm which would be secured to the wall in a sealing relation.

While the embodiment of the present invention as herein disclosed, contitutes a preferred form, it is to be understood that other forms might be adopted, all coming within the scope of the claims which follow.

What is claimed is as follows:

1. A container for enclosing hermetically an electrical device therein comprising, a pair of cup-shaped members removably secured to each other and in hermetically sealed relation to form a large chamber, one of said members having an opening in its bottom wall and having apertures in one of its side walls; terminals extending through the apertures and connected with the device supported within the chamber; resilient non-porous insulating material between the terminals and the marginal walls of each aperture to insulate each terminal from the said member and also to seal hermetically the spaces between each terminal and the member to prevent fluid from passing through the apertures; a flat non-porous yieldable diaphragm closing the opening; a deformed plate detachably secured to the bottom wall of the specified one member for clamping the peripheral edge of the diaphragm between the bottom wall to close the opening and forming a sealed joint thereabout and at the same time forming a small chamber with air trapped therein between the diaphragm and plate, said diaphragm adapted to move into the small chamber and compress the trapped air therein when air trapped within the large chamber expands, due to heat, and thereby prevent the trapped air in either chamber from passing through any of the sealed joints and also prevent outside fluid from entering the chambers through any of the sealed joints when the air within the large chamber contracts.

2. A container for enclosing hermetically an electrical instrument therein comprising in combination; a casing member; a cover member for the casing; terminals extending through openings provided by one of the members and electrically connected with the instrument; resilient non-porous insulating material between the terminals and said one member to insulate the terminals from the member and also to seal hermetically the space between the terminals and said one member; a flat yieldable non-porous diaphragm clamped in sealed relation with one of the members to provide a chamber for the instrument on one side of the diaphragm and an auxiliary chamber on the other side thereof; a sealing element of non-porous compressible material between the members; clamping means for holding the members together and also for compressing the sealing element to seal hermetically the instrument chamber and trap the air therein, said diaphragm stretching upon expansion of the air within the instrument chamber, due to heat, and projecting into the auxiliary chamber to compress the air therein and thereby prevent the trapped air in the instrument chamber from being forced past any of the seals during expansion of the air, said compressed air in the auxiliary chamber assisting in returning the diaphragm to its normal position as the air in the instrument chamber contracts.

3. A housing for electrical means comprising, a housing including two rigid members having cavities therein; means including gasket means for securing the members together to form a hermetically sealed chamber whereby no fluid can enter or leave the chamber; a diaphragm sealed to one wall of one of the members in a manner to divide the chamber into two hermetically sealed portions, one of said portions being relatively larger to support the electrical means and the other portion being relatively small, said diaphragm stretching when the fluid in the large portion of the chamber expands due to heat, to compress the fluid in the small portion of the chamber, said compressed fluid assisting in returning the diaphragm to its normal position as the fluid in the large portion of the chamber contracts.

4. A container for an electrical apparatus comprising a casing which forms a hermetically sealed chamber wherein no fluid can enter or leave a flat diaphragm of yieldable material sealed to one wall of the chamber and in a manner to divide the chamber into two hermetically sealed compartments, one of said compartments being relatively large to house the electrical apparatus and the other compartment being relatively small, said diaphragm yielding under fluid pressure in the large compartment, due to heat, to compress the fluid in the small compartment, said fluid under compression progressively returning the diaphragm to its normal position as the fluid in the large compartment contracts.

JAMES V. BROWN.

REFERENCES CITED

The following references are of record in the file of this patent:

UNITED STATES PATENTS

| Number | Name | Date |
|---|---|---|
| 325,806 | Abrahamson | Sept. 8, 1885 |
| 1,709,701 | Althoff | Apr. 16, 1929 |
| 1,769,562 | Wood | July 1, 1930 |
| 1,959,191 | Acly | May 15, 1934 |
| 2,000,863 | Powell | May 7, 1935 |
| 2,081,930 | Hoffman | June 1, 1937 |
| 2,132,952 | Hewitt | Oct. 11, 1938 |
| 2,304,757 | Arthur | Dec. 8, 1942 |
| 2,368,503 | Unger | Jan. 30, 1945 |

FOREIGN PATENTS

| Number | Country | Date |
|---|---|---|
| 252,845 | Great Britain | June 10, 1926 |